United States Patent
Liang et al.

(10) Patent No.: US 12,187,614 B2
(45) Date of Patent: *Jan. 7, 2025

(54) COMPOSITE GRAPHITE MATERIAL AND METHOD FOR PREPARATION THEREOF, SECONDARY BATTERY, AND APPARATUS

(71) Applicant: Contemporary Amperex Technology Co., Limited, Ningde (CN)

(72) Inventors: Chengdu Liang, Ningde (CN); Yuzhen Zhao, Ningde (CN); Yan Wen, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 562 days.

This patent is subject to a terminal disclaimer.

(21) Appl. No.: 17/475,365

(22) Filed: Sep. 15, 2021

(65) Prior Publication Data

US 2022/0002160 A1 Jan. 6, 2022

Related U.S. Application Data

(63) Continuation of application No. PCT/CN2019/122743, filed on Dec. 3, 2019.

(51) Int. Cl.
*C01B 32/205* (2017.01)
*C01B 32/20* (2017.01)
(Continued)

(52) U.S. Cl.
CPC ............ *C01B 32/205* (2017.08); *C01B 32/20* (2017.08); *C01B 32/21* (2017.08); *H01M 4/133* (2013.01);
(Continued)

(58) Field of Classification Search
None
See application file for complete search history.

(56) References Cited

U.S. PATENT DOCUMENTS 11,710,822 B2 * 7/2023 Liang ................ H01M 10/0525
252/182.1
12,021,235 B2 * 6/2024 He ........................ C01B 32/205
(Continued)

FOREIGN PATENT DOCUMENTS

CN 101916846 A 12/2010
CN 102299307 A 12/2011
(Continued)

OTHER PUBLICATIONS

Polyaniline wikipedia entry to show bond structure (Year: 2024).*
(Continued)

*Primary Examiner* — Kevin M Bernatz
(74) *Attorney, Agent, or Firm* — East IP P.C.

(57) ABSTRACT

The present application discloses a composite graphite material and a method for preparing the same, a secondary battery, and an apparatus. The composite graphite material includes a core material and a coating layer that coats at least a portion of the surface of the core material, the core material including graphite, and the coating layer including a coating material containing a cyclic structure moiety, wherein the composite graphite material has a weight-loss rate of from 0.1% to 0.55% when the composite graphite material is heated in an atmosphere of an inert non-oxidative gas at a temperature rising from 40° C. to 800° C. The composite graphite material can enhance the gram capability and reduce the expansion rate of an electrode plate, and more preferably, can improve the cycle performance and kinetic performance of a battery as well.

20 Claims, 6 Drawing Sheets

(51) Int. Cl.
   *C01B 32/21*     (2017.01)
   *H01M 4/133*    (2010.01)
   *H01M 4/36*      (2006.01)
   *H01M 4/62*      (2006.01)
   *H01M 10/0525*  (2010.01)

(52) U.S. Cl.
   CPC ......... *H01M 4/366* (2013.01); *H01M 4/625* (2013.01); *H01M 10/0525* (2013.01); *C01P 2002/74* (2013.01); *C01P 2002/82* (2013.01); *C01P 2004/61* (2013.01); *C01P 2006/10* (2013.01); *C01P 2006/11* (2013.01); *C01P 2006/12* (2013.01); *C01P 2006/40* (2013.01)

(56) References Cited

U.S. PATENT DOCUMENTS

| | | | |
|---|---|---|---|
| 2009/0202917 A1* | 8/2009 | Sotowa | H01M 10/0569 528/481 |
| 2011/0183180 A1* | 7/2011 | Yu | H01M 4/583 977/734 |
| 2012/0171103 A1* | 7/2012 | Zhao | H10K 85/225 570/143 |
| 2012/0196193 A1* | 8/2012 | Sotowa | H01M 4/133 429/211 |
| 2013/0040203 A1* | 2/2013 | Yoon | H01M 4/587 427/113 |
| 2015/0349332 A1* | 12/2015 | Azami | H01M 10/058 429/188 |
| 2015/0364751 A1* | 12/2015 | Wakizaka | C01B 32/21 423/448 |
| 2019/0036121 A1 | 1/2019 | Cho et al. | |
| 2019/0097271 A1* | 3/2019 | Wang | H01M 4/667 |
| 2019/0214640 A1* | 7/2019 | Salem | H01M 4/134 |
| 2020/0075941 A1* | 3/2020 | Kim | H01M 10/052 |
| 2020/0313176 A1* | 10/2020 | Wang | H01M 4/133 |
| 2021/0020898 A1* | 1/2021 | Lee | H01M 4/0433 |
| 2022/0123307 A1* | 4/2022 | Li | H01M 4/1393 |
| 2023/0187638 A1* | 6/2023 | Tian | H01M 4/13 429/221 |
| 2024/0021775 A1* | 1/2024 | Cai | H01M 4/0404 |
| 2024/0113284 A1* | 4/2024 | Piao | H01M 4/587 |

FOREIGN PATENT DOCUMENTS

| | | |
|---|---|---|
| CN | 103081191 A | 5/2013 |
| CN | 103688395 A | 3/2014 |
| CN | 106410200 A | 2/2017 |
| CN | 107743659 A | 2/2018 |
| CN | 106410200 B | 8/2018 |
| CN | 110072810 A | 7/2019 |
| CN | 110364690 A | 10/2019 |
| EP | 3872903 A1 | 9/2021 |
| JP | 10284080 A | 10/1998 |
| JP | 2013542559 A | 11/2013 |
| KR | 1020130046423 A | 5/2013 |
| WO | 2014/048390 A1 | 4/2014 |
| WO | 2016123718 A1 | 8/2016 |

OTHER PUBLICATIONS

The extended European search report for EP Application No. 19954825.6, dated Mar. 2, 2022, 8 pages.

The First Office Action for JP Application No. 2022-520243, dated May 8, 2023, 6 pages.

The First Office Action for CN Application No. 201980066188.0, dated Sep. 30, 2023, 14 pages.

The Communication pursuant to Article 94(3) EPC for Europe an Application No. 19954825.6, dated Oct. 4, 2022, 6 pages.

The First Office Action forIndia Application No. 202217030957, dated Sep. 22, 2022, 6 pages.

The International search report for PCT Application No. PCT/CN2019/122743, dated Sep. 9, 2020, 13 pages.

Yao Shuhua et al. The structure property and application of conductive material of pyrolytic polyacrylonitrile. Journal of Northeast Normal University, Natural Science Edition, No. 1, vol. 33 ISSN: 1000-1832 Full Text, dated Mar. 31, 2001.

The First Office Action for the Korean Application No. 10-2022-7011947, dated Oct. 7, 2024, 19 pages.

Jeremy D.Moskowitz et al.Semibatch RAFT copolymerization of acrylonitrile and N-isopropylacrylamide: Effect of comonomer distribution on cyclization and thermal stability. Polymer 84 (2016) pp. 311~318, dated Dec. 29, 2015.

* cited by examiner

COMPOSITE GRAPHITE MATERIAL AND METHOD FOR PREPARATION THEREOF, SECONDARY BATTERY, AND APPARATUS

CROSS-REFERENCES TO RELATED APPLICATIONS

The present application is a continuation of International Application No. PCT/CN2019/122743, filed on Dec. 3, 2019, which is hereby incorporated by reference in their entireties.

TECHNICAL FIELD

The present application relates to the technical field of energy-storage materials, and specially relates to secondary batteries. In particular, the present application relates to a composite graphite material and method for the preparation thereof, a secondary battery, and an apparatus.

BACKGROUND

Secondary batteries are widely used in various digital products, portable devices, electrical vehicles, energy-storage power sources, and so on for advantages such as high energy density, long cycle life, safety and reliability, and no memory effect.

At present, carbonaceous materials are usually used as the negative active material in the commercially common secondary batteries. Among the carbonaceous materials, graphite is widely used in the secondary batteries owing to its advantages such as the high theoretic gram capability (372 mA·h/g) and the environmental friendliness. Generally, the gram capability of a graphite material could not reach its theoretic gram capability in actual products. Current approaches to improve the gram capability of a graphite material often affect other electrochemical performances of batteries.

Therefore, it is indeed needed to provide a material having a high gram capability without compromising other performances.

SUMMARY

In a first aspect of the present application, there is provided a composite graphite material including a core material and a coating layer that coats at least a portion of the surface of the core material, wherein the core material includes graphite, and the coating layer includes a coating material containing a cyclic structure moiety, and wherein the composite graphite material has a weight-loss rate of from 0.1% to 0.55% when the composite graphite material is heated in an atmosphere of an inert non-oxidative gas at a temperature rising from 40° C. to 800° C. The composite graphite material of the present application can improve the gram capability and reduce the expansion rate of an electrode plate, and more preferably can also improve the cycle performance and/or the kinetic performance of a battery.

In a second aspect of the present application, there is provided a method for preparing a composite graphite material, including the steps of
(1) mixing a solution containing a cyclizable polymer with graphite to obtain a slurry, wherein a mass ratio of the graphite to the cyclizable polymer is from 30:1 to 400:1;
(2) drying the slurry to obtain powder;
(3) heat treating the powder at a temperature between 300° C. and 400° C. to obtain the composite graphite material comprising a core material and a coating layer that coats at least a portion of the surface of the core material,
wherein the core material comprises the graphite, and the coating layer comprises a coating material containing a cyclic structure moiety, and wherein the composite graphite material has a weight-loss rate of from 0.1% to 0.55% when the composite graphite material is heated in an atmosphere of an inert non-oxidative gas at a temperature rising from 40° C. to 800° C.

In a third aspect of the present application, there is provided a secondary battery, including a negative electrode plate which includes a negative active material, the negative active material including the composite graphite material according to the first aspect of the present application.

In a fourth aspect of the present application, there is provided an apparatus including the secondary battery according to the third aspect of the present application.

Use of the composite graphite material including the coating layer containing a cyclic structure moiety according to the present application not only improves the gram capability of the negative active material, but also reduces the expansion rate of a negative electrode plate including the composite graphite material; furthermore, use of the composite graphite material in a battery can improve the kinetic performance and/or cycle performance of the battery. In the method according to the second aspect of the present application, the composite graphite material is obtained with the above-mentioned advantages by strictly controlling the degrees of cyclization and carbonization of the polymer in the coating layer, which is unexpected to a person of ordinary skill in the art.

DESCRIPTION OF THE DRAWINGS

In order to explain the technical solutions of the embodiments of the present application more clearly, the drawings for embodiments of the present application will be briefly described below. Apparently, the drawings described below illustrate only some embodiments of the present application. A person of ordinary skill in the art can obtain other drawings based on the drawings without creative work.

Figure 1:
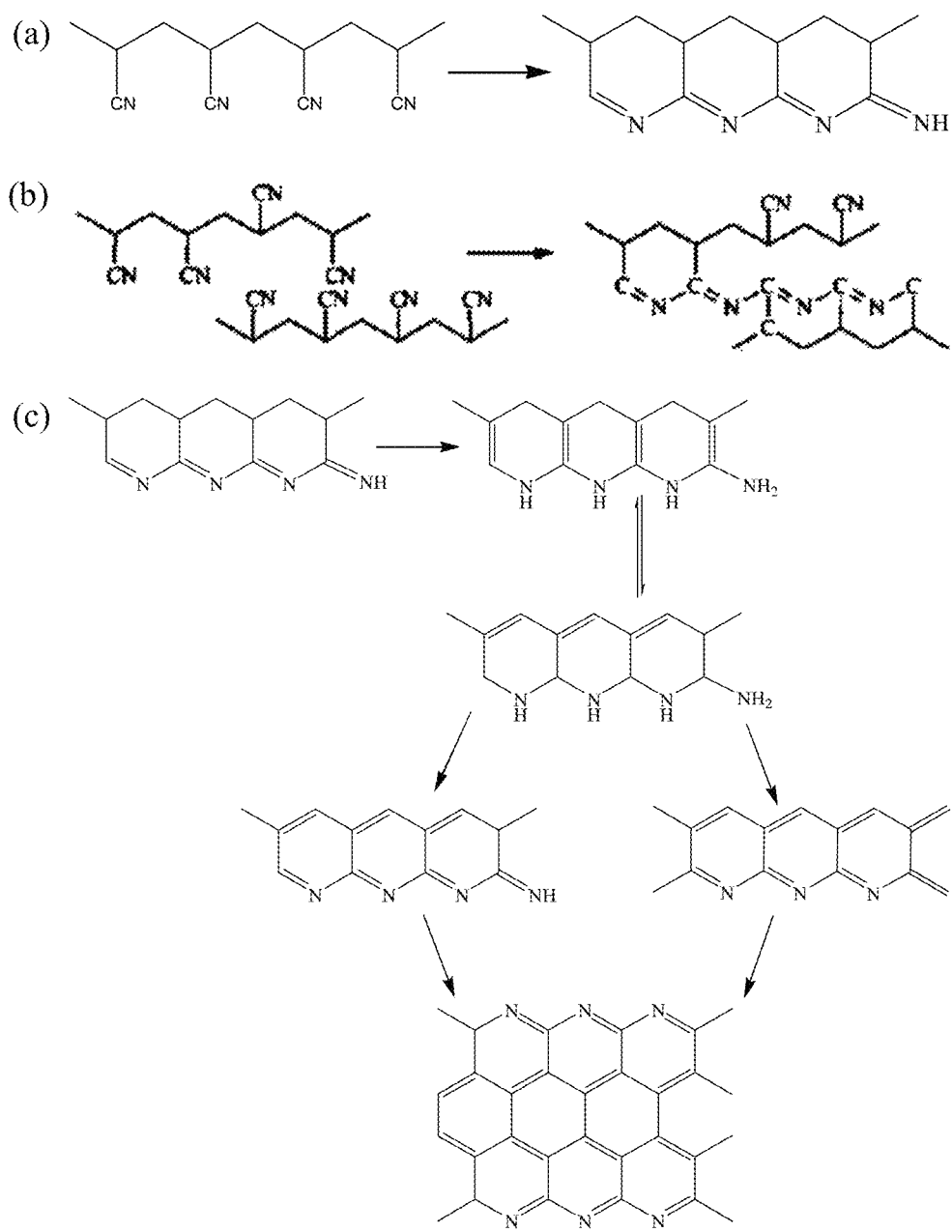
FIG. 1 illustrates the reaction scheme of cyclization and partial carbonization of polyacrylonitrile.

In the drawings, the designation of the reference signs is as follows:

1. Battery pack;
2. Upper case body;
3. Lower case body;
4. Battery module;
5. Secondary battery;
10. Core material;
20. Coating layer.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

When a composition is described as comprising, including, containing, or having certain components, it is intended that the composition may include other optional components than the certain components expressly listed, and that the composition may consist of or be composed of the certain components; when a method is described as comprising, including, containing, or having certain steps, it is intended that the method may include other optional steps than the certain steps expressly listed, and that the method may consist of or be composed of the certain steps.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The terms, "preferred", "preferably", and any other variation thereof, are used to refer to some embodiments of the present application that may provide certain advantages under certain circumstances. Under the same or other circumstances, however, other embodiments may be preferred. Additionally the description of one or more preferred embodiment in no way indicates that other embodiments should be unusable, and it is not intended to exclude other embodiments from the scope of the invention.

The above-stated summary of the present application is not intended to describe each and every embodiment or implementation disclosed in this application. The following description illustrates exemplary embodiments more specifically. In many places throughout the application, guidance is provided by means of a series of embodiments, which can be applied in various combinations, and the embodiments resulted from the combinations shall be regarded as such specific embodiments or examples as expressly disclosed therein. In each instance, the enumeration is only a representative group and should not be interpreted as exhaustive.

Coated Graphite Material

In the first aspect of the present application, there is provided a composite graphite material comprising a core material and a coating layer that coats at least a portion of the surface of the core material, wherein the core material comprises graphite, and the coating layer comprises a coating material containing a cyclic structure moiety, and wherein the composite graphite material has a weight-loss rate of from 0.1% to 0.55% when the composite graphite material is heated in an atmosphere of an inert non-oxidative gas at a temperature rising from 40° C. to 800° C.

In preferred embodiments, the composite graphite material has a weight-loss rate of from 0.1% to 0.4%, more preferably from 0.1% to 0.3 when the composite graphite material is heated in an atmosphere of an inert non-oxidative gas at a temperature rising from 40° C. to 800° C. The inventors have found that when the weight-loss rate of the composite graphite material is made to fall within the given range, the composite graphite material has a higher gram capability and also provide a battery with better cycle performance and anti-swelling performance. If the weight-loss rate of the composite graphite material is less than 0.1%, then coating integrity of the coating layer on the surface of the graphite core material will significantly deteriorate, so that on the one hand, the effect of the coating layer itself on enhancing the gram capability of the material will be reduced, and on the other hand, the interaction between the coating layer and a binder will weaken, rendering adhesion and cohesion of the electrode plate relatively low, and thus the expansion rate of the electrode plate goes up during cycling. If the weight-loss rate of the composite graphite material is more than 0.55%, then the material will cause excessive consumption of active ions during cycling, degrading the cycle performance of a battery core; meanwhile, the more the active ion are consumed, the thicker the side reaction layer on the surface of the composite graphite material, which also causes the expansion of the electrode plate up.

In one or more embodiments, the inert non-oxidizing gas may be one or more of nitrogen, carbon dioxide, ammonia, helium, and argon. In some preferred embodiments, nitrogen may be used as the inert non-oxidizing gas.

Based on the present disclosure, a person of ordinary skill in the art can reasonably determine the heating rate during the weight-loss process. For example, the heating rate during the weight-loss process may be 10° C./min or lower, preferably 5° C./min or lower. As an example, the weight-loss rate is measured at a rate of 10° C./min from 40° C. to 800° C. in an atmosphere of the inert non-oxidizing gas (such as nitrogen gas).

In the composite graphite material of the present application, at least a portion of the surface of the core material is coated with the coating layer. In some preferred embodiments, the composite graphite material comprises the core material and the coating layer that coats at least 80% of the surface of the core material. More preferably, the composite graphite material comprises the core material and the coating layer that coats at least 90% of the surface of the core material. In some preferred embodiments, the composite graphite material comprises the core material and the coating layer that coats the surface of the core material.

In one or more embodiments of the present application, the coating layer comprises the coating material containing a nitrogen-containing heterocyclic moiety, and at least a portion of the nitrogen-containing heterocyclic moieties has a carbon-nitrogen double bond. In this way, the hydrophilicity of the composite graphite material is greatly improved. During agitation of an aqueous negative slurry, the composite graphite material is dispersed within the slurry more stably and stay in a more even contact with the binder, so that the adhesion and cohesion of the electrode plate may be enhanced, which may thus improve the battery's cycle and anti-swelling performances.

The coating layer containing the above-described structure moiety itself can participate in deintercalation of active ions and provides more channels for the deintercalation of active ions, furnishing the composite graphite material with additional capacity in addition to the core material, thereby increasing the gram capacity thereof. This is unexpected by a person of ordinary skill in the art, because in general, coating the surface of graphite materials with other coatings (such as amorphous carbon coatings, conventional polymer coatings) will result in the reduction of effective active materials, thereby reducing the gram capacity of the materials. In addition, taking into account the difficulty in further increasing the gram capacity as the gram capacity of the graphite materials approaches the theoretical value, the present application represents a technological progress of more significant importance in improving the gram capacity of the graphite materials.

In addition, since the coating layer containing the above-described structure moiety provides more suitable channels for the deintercalation of active ion, the active ion transmission efficiency of the material is improved. Also, the coating layer has a good electronic conductivity. Therefore, the composite graphite material has good kinetic characteristics, which improves the kinetic performance and cycle performance of a battery making use of the material.

The nitrogen-containing heterocyclic moiety may contain fused rings or non-fused rings. In some preferred embodiments, the nitrogen-containing heterocyclic moiety comprises a fused aza-heterocyclic moiety with at least some of the nitrogen-containing heterocycles thereof having a carbon-nitrogen double bond.

In some embodiments, some of the nitrogen-containing heterocycles also have a carbon-carbon double bond. The conductivity of the coating layer is further improved.

In some embodiments, the nitrogen-containing heterocycles are a five-membered ring or a six-membered ring. In this way, the coating layer has higher elasticity and toughness, so that it can better adapt to the expansion and contraction of the core material caused by repeated deintercalation/intercalation of lithium ions, and isolate the surface of the core material from contact with the electrolytic solution so as to reduce the capacity loss of the composite graphite material owing to the corrosion by the electrolytic solution, thereby improving the cycle performance of the battery.

In some embodiments, the nitrogen-containing heterocyclic moiety may comprise one or more of a pyridine ring, an imidazole ring, a quinoline ring, and a pyrimidine ring. Preferably, the nitrogen-containing heterocyclic moiety comprises one or more of the fused aza-heterocyclic moieties of Formula 1 to Formula 3. Preferably, the nitrogen-containing heterocyclic moiety comprises a combination of at least two of Formula 1 to Formula 3. More preferably, the nitrogen-containing heterocyclic moiety comprises a combination of three of Formula 1 to Formula 3:

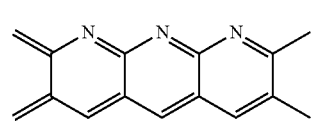

Formula 1

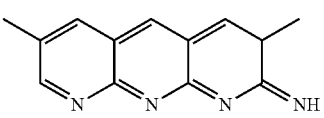

Formula 2

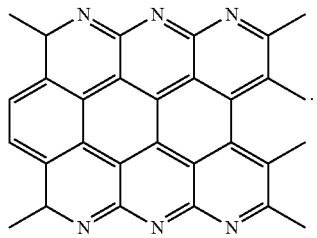

Formula 3

In some embodiments, the core material of the composite graphite material may be one or more selected from artificial graphite and natural graphite.

In some preferred embodiments, when the core material of the composite graphite material is artificial graphite, the composite graphite material that satisfies one or more of the parameters as described below will further improve the performance of the material.

In some preferred embodiments, the composite graphite material has a D-peak intensity $I_D$ and a G-peak intensity $I_G$ with the ratio of $I_D/I_G$ ranging from 0.4 to 1.0. Peak D and Peak G are the Raman characteristic peaks of graphite materials. The intensity of Peak D and Peak G can be measured with a laser Raman spectroscopy, such as the LabRAM HR Evolution Raman spectrometer. In a Raman spectrum measured with the Raman spectrometer, Peak D is at the position of 1300 cm$^{-1}$ to 1400 cm$^{-1}$, and Peak G is at the position of 1550 cm$^{-1}$ to 1620 cm$^{-1}$.

In some embodiments, the ratio of $I_D/I_G$ of the composite graphite material is from 0.4 to 1.0. For example, the ratio of $I_D/I_G$ of the composite graphite material may be from 0.4 to 0.95, from 0.45 to 0.9, or from 0.5 to 0.8. When the composite graphite material of the present application has the ratio of $I_D/I_G$ within the given ranges, the surface stability of the material can be further improved, and therefore, the volume expansion of the negative electrode plate can be further reduced during the cycle of the battery. Preferably, the ratio of $I_D/I_G$ of the composite graphite material is from 0.5 to 0.8.

In some preferred embodiments, when the composite graphite material is in an electrode plate with a compaction density (PD) of from 1.6 g/cm$^3$ to 1.7 g/cm$^3$, the orientation index (OI) value of the composite graphite material in the electrode plate is less than or equal to 15, preferably from 8 to 12.

When the OI value of the composite graphite material in an electrode plate with the certain compaction density (PD) is within the given range, the composite graphite material has relatively high isotropy, and therefore, the expansion of the composite graphite material in the electrode plate during the cycle of a battery is distributed in various directions, so that the expansion of the electrode plate during the cycle can be further reduced.

In the context of the present application, the orientation index (OI) value of the composite graphite material is defined as the ratio of $C_{004}/C_{110}$, wherein $C_{004}$ and $C_{110}$ represent the peak areas of the (004) crystal plane diffraction peak and the (110) crystal plane diffraction peak of the composite graphite material, respectively, which can be determined using an X-ray diffraction analysis.

The X-ray diffraction analysis can refer to the standard JISK 0131-1996, using an X-ray diffractometer (e.g. Bruker D8 Discover X-ray diffractometer). For the X-ray diffraction analysis, a copper target can be used as the anode target while a 0.02 mm-thick Ni filter sheet is used to filter out $CuK_\beta$ rays so as to use $CuK_\alpha$ rays as the radiation source with the ray wavelength $\lambda=1.5418$ Å (a weighted average of $CuK_{\alpha1}$ and $CuK_{\alpha2}$); the scanning angle range for 2θ is from 20° to 80°, and the scanning rate is 4°/min.

The electrode plate suitable for measuring the orientation index OI of the composite graphite material of the present application can be prepared according to an exemplary process described as follows.

The composite graphite material of the present application, styrene-butadiene rubber (SBR) as a binder, sodium carboxymethyl cellulose (CMC-Na) as a thickener, and conductive carbon black (Super P) as a conductive agent are dispersed at a mass ratio of 96.2:1.8:1.2:0.8 in deionized water and mixed uniformly to form a slurry; the electrode slurry is evenly coated on a copper foil current collector, and the areal density of coating can range from 10 mg/cm² to 11 mg/cm² (such as 10.5 mg/cm²). The electrode plate is dried and then cold pressed using a cold press to achieve the compaction density after cold pressing ranging from 1.6 g/cm³ to 1.7 g/cm³ (such as 1.65 g/cm³). The thus-prepared electrode plate is placed in an X-ray diffractometer, and the peak area $C_{004}$ of the (004) crystal plane diffraction peak and the peak area $C_{110}$ of the (110) crystal plane diffraction peak of the composite graphite material in the electrode plate are determined using the X-ray diffraction analysis so as to obtain the ratio of $C_{004}/C_{110}$ as the orientation index (OI) value of the composite graphite material.

In some embodiments, the volume average particle size $D_v50$ of the composite graphite material may be from 15 μm to 20 μm, preferably from 15 μm to 18 μm.

The composite graphite material having the appropriate $D_v50$ can provide good active ion and electron transport performance, while it can also reduce the side reaction of an electrolytic solution at the negative electrode. In addition, the composite graphite material having the appropriate $D_v50$ is also beneficial to enhancing its own powder compaction density.

In some embodiments, the volume average particle size $D_v10$ of the composite graphite material is more than or equal to 6 μm. For example, $D_v10$ of the composite graphite material may be ≥6 μm, ≥6.5 μm, ≥7 μm, or ≥7.5 μm. Use of such composite graphite material can result in a relatively low active specific surface area, which can further reduce the side reaction in the secondary battery. Moreover, $D_v10$ of the composite graphite material may be ≤11 μm, ≤10.5 μm, ≤10 μm, ≤9.5 μm, or ≤9 μm. Preferably, the $D_v10$ is within a range as represented by 6.5 μm≤$D_v10$≤10.5 μm.

In some embodiments, the number average particle size $D_n10$ of the composite graphite material may be from 1.0 μm to 3.0 μm, preferably from 1.2 μm to 2.0 μm, more preferably from 1.3 μm to 1.8 μm. For example. $D_n10$ of the composite graphite material may be about 1.3 μm, 1.4 μm, 1.5 μm, 1.6 μm, 1.7 μm, or 1.8 μm.

When the composite graphite material has the appropriate $D_n10$, the side reaction of the material with the electrolytic solution can be reduced. Moreover, in a negative electrode plate prepared from the composite graphite material, an even dispersion of the composite graphite material with the binder and other additives can be achieved, providing a high adhesion for the overall electrode plate. As a result, the cycle performance and the anti-swelling performance of the battery can be further improved. Particularly, the appropriate $D_n10$ of the composite graphite material also allows the material to have a relatively high gram capability.

In the present application, $D_n10$, $D_v10$, and $D_v50$ of the composite graphite material can be measured with a laser particle size analyzer (such as Malvern Master Size 3000) with reference to the standard GB/T 19077.1-2016.

In the context, the physical definitions of $D_n10$, $D_v10$, and $D_v50$ are as follows:

$D_n10$=the particle size when the cumulative number distribution percentage of the material reaches 10%;

$D_v10$=the particle size when the cumulative volume distribution percentage of the material reaches 10%;

$D_v50$=the particle size when the cumulative volume distribution percentage of the material reaches 50%.

In some embodiments, the specific surface area (SSA) of the composite graphite material is from 0.5 μm²/g to 1.3 μm²/g, preferably from 0.6 μm²/g to 1.0 μm²/g.

The composite graphite material having the suitable specific surface area can reduce the side reaction of the electrolytic solution on its surface and thus the amount of gas generated, thereby reducing the volume expansion of the secondary battery during cycling. Meanwhile, the composite graphite material also has a relatively high electrochemical reaction activity, which can further improve the kinetic performance of the secondary battery so as to be beneficial to satisfying the requirement of apparatus for power. Additionally, the appropriate specific surface area enables a strong binding force between the composite graphite material and the binder and thus improves the adhesion and cohesion of the electrode plate so as to further reduce the expansion of the electrode plate during cycling.

The specific surface area can be measured using a method known in the art. For example, the measurement with analysis of the specific surface area by nitrogen adsorption can be performed according to GB/T 19587-2017, and the specific surface area can be calculated by the BET (Brunauer Emmett Teller) method, in which the analysis of the specific surface area by nitrogen adsorption can be carried out with a specific surface and pore size distribution analyzer (Type-Tri Star 3020) from Micromeritics, USA.

In some embodiments, the compaction density of the composite graphite material measured under a pressure of 5 tons is from 1.80 g/cm³ to 2.10 g/cm³, preferably from 1.93 g/cm³ to 2.05 g/cm³. The composite graphite material with the appropriate compaction density according to the embodiments allows the material per se to have a relatively high gram capacity. The negative electrode plate making use of the composite graphite material can also have a relatively high compaction density, allowing the battery to have a relatively high energy density.

The powder compaction density can be determined using a methods known in the art. For example, referring to GB/T 24533-2009, use an electronic pressure testing instrument (such as UTM7305) to carry out the measurement as follows: put a certain amount of powder on a special compaction mold, set different pressures, read the values of thickness of the powder under different pressures from the instrument, and calculate the compaction density under a certain pressure.

In some embodiments, the tap density of the composite graphite material may be from 0.8 g/cm³ to 1.15 g/cm³, preferably from 0.9 g/cm³ to 1.05 g/cm³. Making us of the composite graphite material with the appropriate suitable tap density according to the embodiments, the negative electrode plate can have a suitable porosity, thereby ensuring a good electrolyte infiltration performance of the electrode plate so as to allow the battery to have a good cyclic performance. Additionally, the appropriate tap density of the composite graphite material advantageously allows the material to achieve a high gram capability. The negative electrode plate making use of the composite graphite material can also have a relatively high compaction density, allowing the battery to achieve an enhanced energy density.

The tap density of the composite graphite material can be determined using a method known in the art. For example, referring to the standard GB/T 5162-2006, use a powder tap density tester (such as Bettersize BT-301, Dandong, China) to perform the measurement.

In some embodiments, the composite graphite material has a sulfur content of less than 0.02 wt. %. The presence of sulfur in the coating layer may affect the stability of the above-described structure moiety, making it difficult to contrail the degrees of cyclization and carbonization of the polymer in the coating layer. The sulfur content can be determined using a method for element analysis.

The composite graphite material of the present application can be prepared using a method according to the second aspect of the present application. Therefore, in the present application, there is also disclosed a composite graphite material obtained with a method according to the second aspect of the present application.

Mothed for Preparing Composite Graphite Material

In the second aspect of the present application, there is provided a method for preparing a composite graphite material, including the steps of
(1) mixing a solution containing a cyclizable polymer with a graphite core material to obtain a slurry, wherein a mass ratio of the graphite to the cyclizable polymer is from 30:1 to 400:1;
(2) drying the slurry to obtain powder;
(3) heat treating the powder at a temperature between 300° C. and 400° C. to obtain the composite graphite material.

The composite graphite material includes a core material and a coating layer that coats at least a portion of the surface of the core material, wherein the core material comprises graphite, and the coating layer comprises a coating material containing a cyclic structure moiety. The composite graphite material has a weight-loss rate of from 0.10% to 0.55% when the composite graphite material is heated in an atmosphere of an inert non-oxidative gas at a temperature rising from 40° C. to 800° C.

Figure 4:
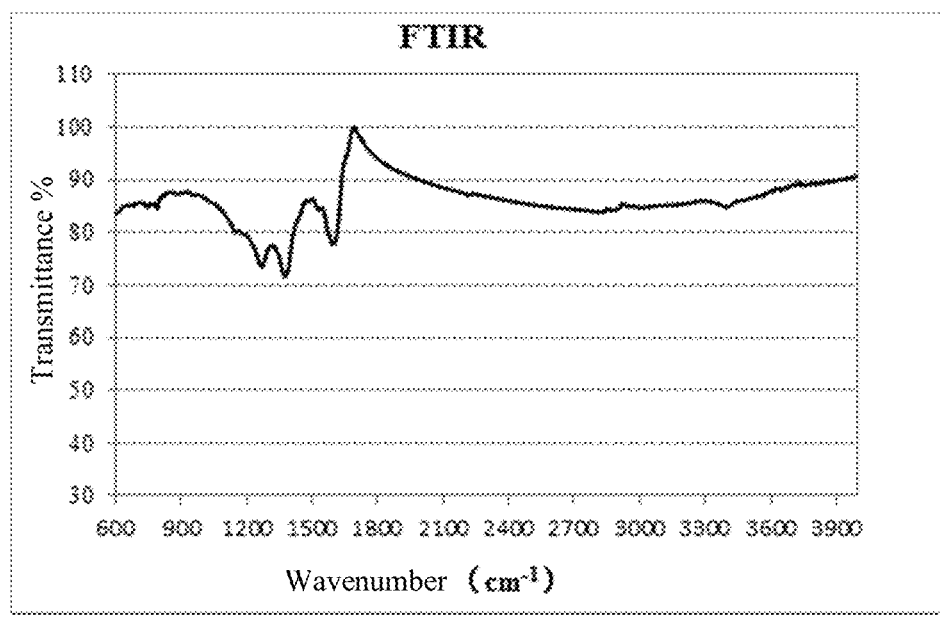
FIG. 4 shows an IR spectrum of the polymer material containing a cyclic structure moiety.

The coating layer may have the structure as described above. FIG. 4 shows an IR spectrum of the polymer material after the steps of drying and heat treating as described above. The absorption peaks for a carbon-nitrogen double bond and a carbon-carbon double bond in the cyclic structure moiety can be clearly observed in FIG. 4.

In some preferred embodiments, the coating layer comprises a coating material containing the cyclic structure moiety of

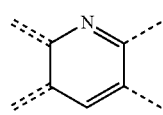

For specific example, the coating layer comprises a coating material containing the cyclic structure moieties having one or more of the following formulae:

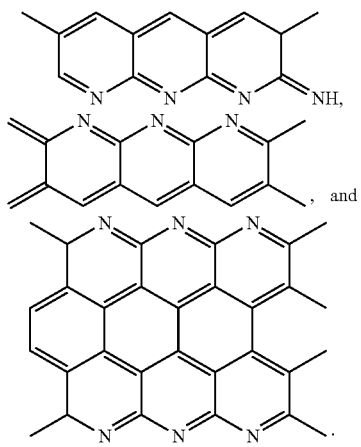

Preferably, the coating layer contains at least two types of such structural moieties as shown above. More preferably, the coating layer contains at least two types of such structural moieties as shown above. Even more preferably, the coating layer contains a combination of such structural moieties as shown above.

The graphite core material used in step (1) can be obtained commercially.

The addition amount of the polymer can be adjusted so as to control the content of the coating layer in the composite graphite material. The temperature and time of the heat treating step can be adjusted so as to control the degrees of cyclization and carbonization of the polymer. Through extensive experiments, the inventors of the present application have figured out the preferable conditions for the amount of the raw material, the temperature and time of the heat treating step. The advantages of adjusting the content of the coating layer to be within the certain range are the same as described above, which will not be repeated here.

In some preferred embodiments, the mass ratio of the graphite to the cyclizable polymer, $m_G:m_P$, is from 40:1 to 200:1, preferably from 50:1 to 150:1. For example, the mass ratio of the graphite to the cyclizable polymer, $m_G:m_P$, may be from 70:1 to 120:1, more preferably from 80:1 to 110:1. In some exemplary embodiments, the mass ratio of the graphite to the cyclizable polymer, $m_G:m_P$, is 100:1.

In some preferred embodiments, the cyclizable polymer in step (1) comprises polyacrylonitrile (PAN) or copolymers thereof. Preferably, the cyclizable polymer comprises polyacrylonitrile or copolymers of acrylonitrile with olefins. More preferably, the cyclizable polymer comprises polyacrylonitrile or copolymers of acrylonitrile with acrylic, acrylamide, or itaconic acid monomers, For example, the cyclizable polymer comprises polyacrylonitrile or copolymers of acrylonitrile with one or more of itaconic acid (IA), vinyl acetate (VAc), acrylic acid (AA), methyl acrylate (MA), and acrylamide (AM). Especially preferably, the polymer is or comprises polyacrylonitrile.

In some embodiments, the number average molecular weight of the cyclizable polymer is from 50,000-150,000 Da, preferably 80,000-120,000 Da.

In some embodiments, in step (1), the solution containing the cyclizable polymer may comprise one or more of N,N-dimethylformamide, N,N-dimethylacetamide, N-methylpyrrolidone, and dimethylsulfoxide. Preferably, the solvent of the solution may be or comprises N,N-dimethylformamide.

The solution containing the cyclizable polymer in step (1) can be obtained using a method known in the art. For example, the solution containing the cyclizable polymer can be obtained by dissolving the cyclizable polymer in a solvent and stirring until dissolved.

A method known in the art can be used to dry the slurry comprising the cyclizable polymer. For example, the method for drying includes, but is not limited to, spray drying, flash evaporation, rotary evaporation, freeze drying, or the like. In some embodiments, spray drying is used in step (2). The drying temperature can be adjusted according to the solvent used in the solution or slurry. Preferably, in step (2), the drying is a spray drying performed at a temperature ranging from 180° C. to 210° C. More preferably, the drying is a spray drying performed at a temperature between 190° C. to 205° C.

According to some embodiments, the heat treating of step (3), is performed in an inert non-oxidizing gas. Examples of the inert non-oxidizing gas comprise, but are not limited to, nitrogen, carbon dioxide, ammonia, and inert gases (such as helium, argon, etc.), or any combination thereof. In some preferred embodiments, nitrogen can be used as the inert non-oxidizing gas.

According to some embodiments, the heat treating of step (3) may be performed at a temperature ranging from 350° C. to 400° C. During the heat treatment of the cyclizable polymer (especially polyacrylonitrile), the heat-treating temperature has a key influence on cyclization and carbonization of the polymer. Through extensive researches, the inventor have found that when the heat treating is performed at a temperature of 200° C. or lower, the polymer coating layer has not been thermally cracked and is still in a polymer state, which provides no gram capacity per se, so the gram capacity of the coated material is reduced. When the temperature is raised from 300° C. to 400° C., the coating layer begins to decompose as the temperature rises, the gram capacity of the material increases, and the anti-swelling performance is also improved to the maximum. As the temperature further rises, for example, when the heat treatment is performed at a temperature of 500° C. or higher, the degree of disorder of the coating layer itself after decomposition of the polymer decreases, so that the improvement in the anti-swelling performance of the electrode plate during cycling cannot be achieved. Therefore, the degrees of cyclization and carbonization of the polymer can be adjusted by strictly controlling the heat-treating temperature. By controlling the heat-treating temperature within the preferable range as described above, it is possible to desirably control the cyclizable polymer (especially polyacrylonitrile) to be partly carbonized while maintaining the cyclic moiety discussed above.

In some embodiments, the heat treating time in step (3) may be from 3 hours to 6 hours, preferably from 3.5 hours to 5 hours. By adopting such appropriate heat treating time, the degree of carbonization of the cyclic polymer (especially polyacrylonitrile) can be controlled, so that the coating layer can have the cyclic structure moiety discussed above.

During the process of heat treatment, the cyclizable polymer (especially poly polyacrylonitrile) is gradually dehydrogenized and cyclized to form cyclic structures, with small molecules like $NH_3$, HCN released. The C≡N bonds disappear gradually, and cyclic structure moieties are formed. FIG. 1 illustrates the reaction scheme of cyclization and partial carbonization of polyacrylonitrile. Generally speaking, it is thought that polyacrylonitrile is mainly intra-molecularly cyclized at a temperature of 220° C. or lower (as shown in FIG. 1(a)), and is intermolecularly cyclized at about 300° C. (as shown in FIG. 1(b)).

When the heat-treating temperature reaches about 350° C. or even 400° C., the cyclic structure moieties begin to partially carbonize, forming the cyclic structure moieties having a carbon-nitrogen double bond and a carbon-carbon double bond or the cyclic structure moiety having

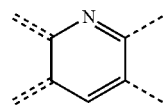

As the carbonization proceeds, there is formed the coating material containing the cyclic structure moieties having one or more of the following formulae:

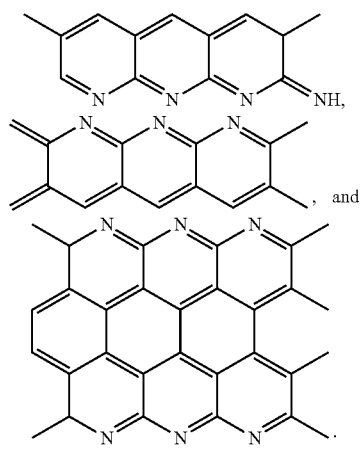

, and

It is worth noting that the degree of carbonization also affects the weight-loss rate of the composite graphite material when heated from 40° C. to 800° C. in an inert non-oxidizing gas atmosphere. If the carbonization degree is too high so that most of the cyclic structural moieties decompose, the weight-loss rate of the resultant composite graphite material will significantly drop. For example, when the carbonization proceeds at 1000° C. for 4 hours, the weight-loss rate of the resultant composite graphite material when heated from 40° C. to 800° C. is extremely small, indicating that most (even almost all) of the cyclizable polymer in the coating layer has been converted into amorphous carbon, which renders the gram capability reduced and the anti-swelling performance of the battery degraded. If the carbonization degree is too low so that the cyclizable polymer (polyacrylonitrile) still preserves a large amount of cyclic structural moieties decompose without sufficient thermolysis for carbonization, then the weight-loss rate of the resultant composite graphite material when heated from 40° C. to 800° C. is rather high, and the resultant composite graphite material has little effect on improvement in the battery performance, resulting in, for example, insufficient kinetic performance of the battery, reduction of the maximum charge rate, or slight lithium plating.

In some preferred embodiments, the graphite core material in step (1) may be prepared through the following steps of:

S10. crushing green coke materials and classifying them;

S20. shaping the product obtained in step S10;

S30. granulating the product obtained in step S20, wherein a binder is added in the granulation process in an amount not more than 5% of the total weight of the raw coke material;

S40: performing graphitization treatment on the product obtained in step S30 at a temperature between 2800° C. and 3200° C. to obtain the graphite.

In the above-described preparation process, the graphite is artificial graphite.

In the above-described preparation process, the green coke material used in in step S10 may be selected from one or more of green petroleum coke and green pitch coke, and preferably comprises green petroleum coke.

Preferably, the green coke is non-needle coke. The non-needle coke may be selected from one or more of non-needle green petroleum coke and non-needle green pitch coke. Preferably, the non-needle coke comprises non-needle green petroleum coke.

In some embodiments, the volatile content of the green coke in step S10 is preferably from 6%-12% (by weight), and more preferably, the volatile content of the green coke is from 7%-10%.

The appropriate volatile content of the green coke can furnish it with a high self-adhesion during step S30 of granulating so as to enhance the adhesion strength between primary particles of graphite, resulting in the artificial graphite with a higher structural strength and a higher gram capacity.

In some embodiments, the sulfur content of the green coke may be 2% or less, 1.5% or less, 1% or less, or 0.5% or less. The low sulfur content of the green coke can reduce the probability that the specific surface area of graphite material will increase owing to escape of more sulfur components in the subsequent process. Preferably, the sulfur content of the green coke is 1% or less.

In some embodiments, step S20 further includes removing fine powder after shaping. The $D_n10$ of the precursor after shaping is adjusted to be in an appropriate range through the removal of fine powder, so that the $D_n10$ of the obtained artificial graphite is in the desired range.

Through extensive researches, the inventors have found that the gram capacity of the artificial graphite can be improve by removing the fine powder after the shaping in step S20.

In step S30, it is preferable that the granulating is carried out without addition of a binder. When the amount of binder is controlled within the appropriate range, the gram capacity can be further improved; especially, in the absence of binder, the self-adhesion of the green coke can be used for granulation so that the overall structural strength of artificial graphite particles can be enhanced. When the artificial graphite is used as the core of the composite graphite material of the present application, the corresponding characteristics of the composite graphite material are also improved. Preferably, when the volatile content of the green coke material is more than 7%, the granular product obtained in step S20 can be granulated without addition of a binder in step S30. However, the volatile content of the green coke material should not be too high, otherwise it will significantly reduce the gram capacity of the graphite and affect its processability for subsequent use.

Furthermore, by adjusting the above process conditions, the volume average particle size $D_v50$ of the granulated product can be within the desired range, or all the $D_v10$, $D_v50$, and $D_v90$ of the granulated product can be within the desired range.

By adjusting the particle size distribution in step S10 and/or S30, the $D_v50$ and $D_v10$ of the finally obtained composite graphite material can be within the desired range. By adjusting and controlling the particle size distribution of the graphite material within the appropriate range, it is also beneficial to obtaining the proper tap density and powder compaction density for the material.

In some preferred embodiments, the temperature for graphitization in step S40 may be from 2900° C. to 3100° C.

Secondary Battery

In the third aspect of the present application, there is provided a secondary battery, including a negative electrode plate which includes a negative active material, wherein the negative active material includes the composite graphite material according to the first aspect of the present application.

In some embodiments, the negative electrode plate comprises a negative electrode current collector and a negative electrode film disposed on at least one surface of the negative electrode current collector and comprising a negative active material that comprises the composite graphite material according to the first aspect of the present application.

Making use of the composite graphite material of the first aspect of the present application, the secondary battery of the present application therefore has a high energy density and excellent anti-swelling performance, so that the battery is allowed to achieve both the high energy density and good cycle performance.

In some embodiments, the negative electrode current collector has two opposite surfaces in its own thickness direction, and the negative electrode film is laminated on either or both of the two opposite surfaces of the negative electrode current collector. The negative electrode current collector can be made of a material with good electrical conductivity and mechanical strength. In some embodiments, copper foil may be used as the negative electrode current collector.

In some embodiments, the negative active material may further comprise other active materials that can be used in the negative electrode of a secondary battery. Examples of other active materials may be one or more of other graphite materials, mesophase carbon microspheres (MCMB in short), hard carbon, and soft carbon.

In some embodiments, the negative electrode film further comprises a binder. As an example, the binder may comprise one or more of polyacrylic acid (PAA), sodium polyacrylate (PAAS), polyvinyl alcohol (PVA), styrene butadiene rubber (SBR), sodium alginate (SA), polymethacrylic acid (PMAA), and carboxymethyl chitosan (CMCS)

In some embodiments, the negative electrode film may further comprise a thickener. As an example, the thickener may be sodium carboxymethyl cellulose (CMC-Na).

In some embodiments, the negative electrode film may further comprise, optionally, a conductive agent. As an example, the conductive agent used for the negative electrode film can be one or more selected from graphite, superconducting carbon, acetylene black, carbon black, Ketjen black, carbon dots, carbon nanotubes, graphene, and carbon nanofibers.

The secondary battery may further comprise a positive electrode plate. During the charging and discharging process of the battery, active ions are intercalated into and deintercalated from the positive electrode plate and the negative electrode plate therebetween back and forth. In some embodiments, the positive electrode plate comprises a positive electrode current collector and a positive electrode film which is disposed on at least one surface of the positive electrode current collector and comprises a positive active material.

As an example, the positive electrode current collector has two opposite surfaces in its own thickness direction, and the positive electrode film is laminated on either or both of the two opposite surfaces of the positive electrode current collector. The positive electrode current collector can be made of a material with good electrical conductivity and mechanical strength. In some embodiments, the positive electrode current collector may be made of an aluminum foil.

The positive electrode plate may comprise a positive active material. There is no specific limitation on the specific type of the positive active materials in the present application; materials known in the art suitable for the positive electrode of a secondary battery can be used, and a person of ordinary skill in the art can make selection according to actual needs.

In some embodiments, the positive active material may be selected from lithium transition metal oxides and modified materials thereof. The modified materials may be doping-modified and/or coating-modified lithium transition metal oxides. For example, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with an olivine structure. Preferably, the positive active material comprises one or more of lithium nickel cobalt manganese oxide and lithium nickel cobalt aluminum oxide.

For example, the positive active material of the secondary battery may be one or more selected from $LiCoO_2$, $LiNiO_2$, $LiMnO_2$, $LiMOn_{24}$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film may further comprise a binder. There is no specific limitation on the type of the binder, and a person of ordinary skill in the art can make selection according to actual needs. For example, the binder used for the positive electrode film may comprise one or more of polyvinylidene fluoride (PVDF) and polytetrafluoroethylene (PTFE).

In some embodiments, the positive electrode film may further comprise a conductive agent. There is no specific limitation on the type of the conductive agent, and a person of ordinary skill in the art can make selection according to actual needs. For example, the conductive agent used for the positive electrode film may comprise one or more of graphite, superconducting carbon, acetylene black, carbon black, Ketjen black, carbon dots, carbon nanotubes, graphene, and carbon nanofibers.

The secondary battery further comprises an electrolyte. The electrolyte conducts ions between the positive electrode plate and the negative electrode plate. There is no specific limitation on the type of the electrolyte in the present application, and it can be selected according to actual needs. For example, the electrolyte may be selected from at least one of a solid electrolyte and a liquid electrolyte (i.e., an electrolytic solution).

In some embodiments, an electrolytic solution is used as the electrolyte. The electrolytic solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additive may comprise a negative electrode film-forming additive, a positive electrode film-forming additive, and/or additives capable of improving certain performance of the battery, such as an additive that improves overcharge performance of the battery, an additives that improve high-temperature performance of the battery, and an additive that improves low-temperature performance of the battery.

In secondary batteries that use the electrolytic solution and some of secondary batteries that use the solid electrolyte, a separator is also included. The separator is disposed between the positive electrode plate and the negative electrode plate to play a role of isolation. There is no specific limitation on the type of the separator, and any well-known porous separator having good electrochemical and mechanical stability can be selected. In some embodiments, the material of the separator can be one or more selected from glass fiber, non-woven fabric, polyethylene, polypropylene, and polyvinylidene fluoride. The separator can be a single-layer film or a multilayer film. When the separator is a multilayer film, the materials of each layer may be the same or different.

Furthermore, some embodiments of the present application provide a method for preparing a secondary battery, including a step of preparing a negative electrode plate from one or more of the composite graphite materials of the present application.

In some embodiments, the step of preparing a negative electrode plate from the composite graphite material of the present application may comprise: dispersing a negative active material comprising the composite graphite material according to the first aspect of the present application, a binder, and optionally, an thickeners and a conductive agent in a solvent, which may be deionized water, to form a uniform negative electrode slurry; coating the negative electrode slurry on a negative electrode current collector, and drying and cold pressing to obtain the negative electrode plate.

The method for preparing a secondary battery may further comprise a step of preparing a positive electrode plate. In some embodiments, a positive active material, a conductive agent, and a binder are dispersed in a solvent (e.g. N-methylpyrrolidone, NMP for short) to form a uniform positive electrode slurry; the positive electrode slurry is coated on a positive electrode current collector, and drying and cold pressing is performed to obtain the positive electrode plate.

The method for preparing a secondary battery may further comprise a step of assembling the negative electrode plate, the positive electrode plate, and the electrolyte into the secondary battery. In some embodiments, the positive electrode plate, the separator, and the negative electrode plate can be wound or laminated in order so that the separator is located between the positive electrode plate and the negative electrode plate to play a role of isolation, thereby obtaining a battery core; the battery core is disposed in an outer package, and then an electrolytic solution is injected and sealed to obtain the secondary battery of the present application.

In some embodiments, the secondary battery may be a lithium-ion secondary battery.

In some embodiments, the secondary battery may comprise an outer package and the battery core encapsulated in the outer package. The number of the battery cores in the secondary battery can be one or more, which can be adjusted according to actual needs.

In some embodiments, the outer package of the secondary battery may be a soft bag (e.g. a bag-type soft bag, which may be made from plastic, such as polypropylene (PP), polybutylene terephthalate (PBT), polybutylene succinate (PBS), or combination thereof), or a hard case (e.g. an aluminum case).

Figure 5:
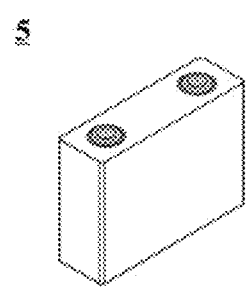
FIG. 5 is a schematic diagram of a secondary battery provided by an embodiment of the present application.

There is no specific limitation on the shape of the secondary battery in the present application, which can be cylindrical, square or any other suitable shape. FIG. 5 shows a secondary battery 5 in the shape of a square as an example.

In some embodiments, the secondary battery can be further assembled into a battery module; a plurality of the secondary batteries can be included in the battery module, and the specific number can be adjusted according to the application and desirable capacity of the battery module.

Figure 2:
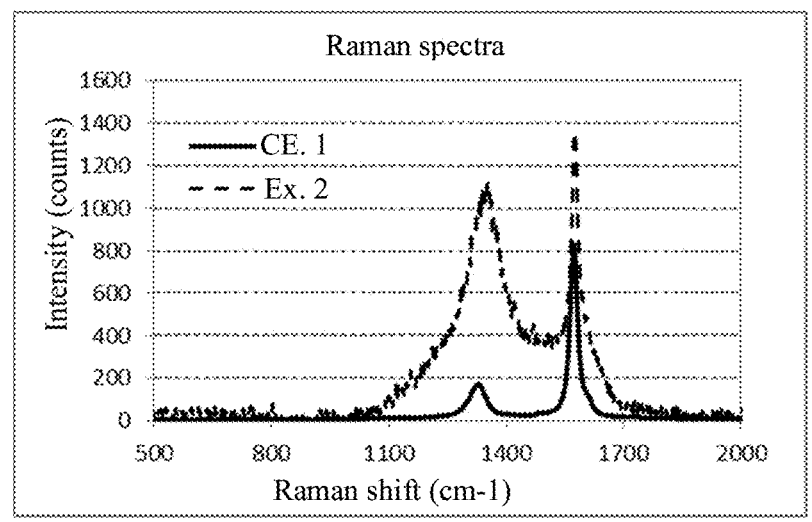
FIG. 2 shows Raman spectra of the composite graphite materials of Example 2 (Ex. 2) and Comparative Example 1 (CE1) according to the present application.
Figure 3:
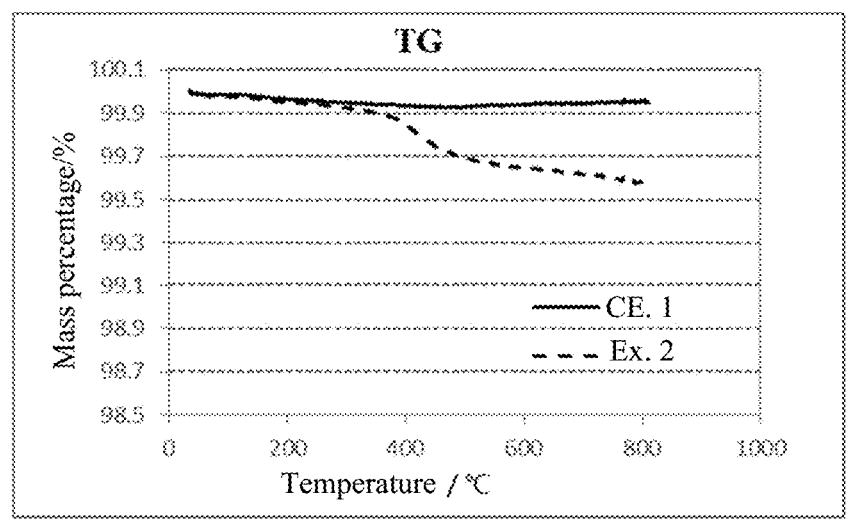
FIG. 3 shows TG diagrams of the composite graphite materials of Example 2 and Comparative Example 1 according to the present application.
Figure 6:
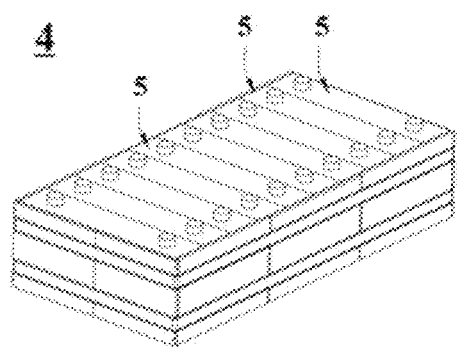
FIG. 6 is a schematic diagram of a battery module provided by an embodiment of the present application.

FIG. 6 shows a battery module 4 as an example. As shown in FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed using fasteners.

Optionally, the battery module 4 may comprise a housing with a receiving space, and the plurality of secondary batteries 5 are received in the receiving space.

In some embodiments, the above-mentioned battery module may further be assembled into a battery pack, and the number of the battery modules included in the battery pack can be adjusted according to the application and desirable capacity of the battery pack.

Figure 7:
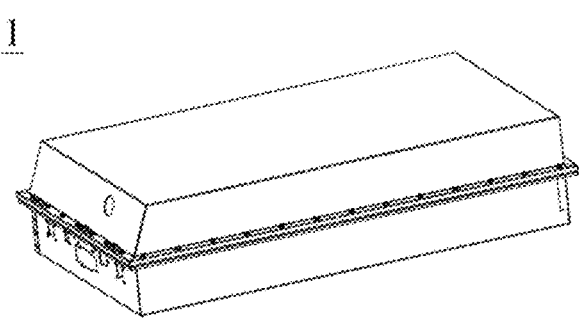
FIG. 7 is a schematic diagram of a battery pack provided by an embodiment of the present application.
Figure 8:
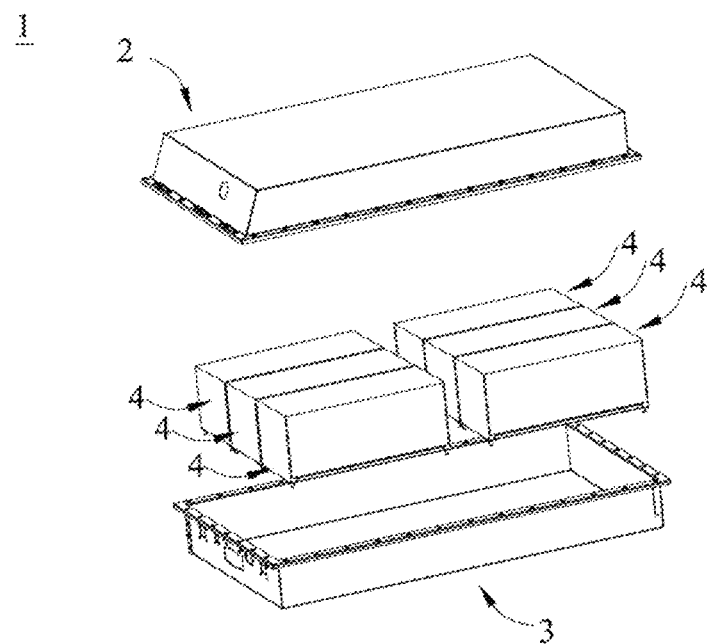
FIG. 8 is an exploded view of the battery pack as shown in FIG. 7.

FIGS. 7 and 8 show a battery pack 1 as an example. As shown in FIGS. 7 and 8, the battery pack 1 may comprise a battery case and a plurality of the battery modules 4 disposed in the battery case. The battery case comprises an upper case body 2 and a lower case body 3. The upper case body 2 can cover the lower case body 3 to form a closed space for receiving the battery modules 4. The battery modules 4 can be disposed in the battery case in any manner.

Apparatus

In the fourth aspect of the present application, there is provided an apparatus comprising the secondary battery according to the third aspect of the present application. The secondary battery may be used as a power supply or energy storage device of the apparatus. The apparatus may be, but is not limited to, a mobile device (e.g., a mobile phone, a laptop computer), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack, depending on its practical requirements.

Figure 9:
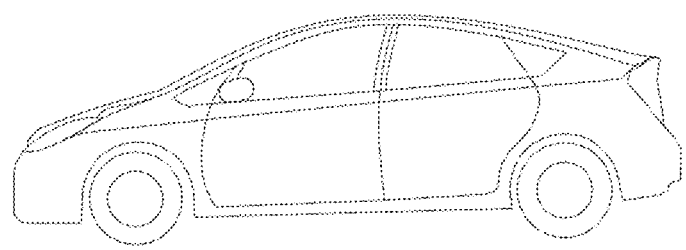
FIG. 9 is a schematic diagram of an apparatus provided by an embodiment of the present application.
Figure 10A:
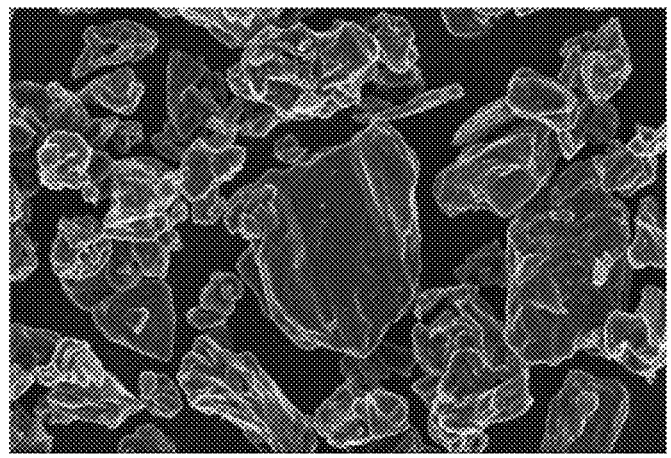
FIGS. 10a and 10b are SEM (scanning electron microscope) images of composite graphite materials provided by embodiments of the present application.
Figure 10B:
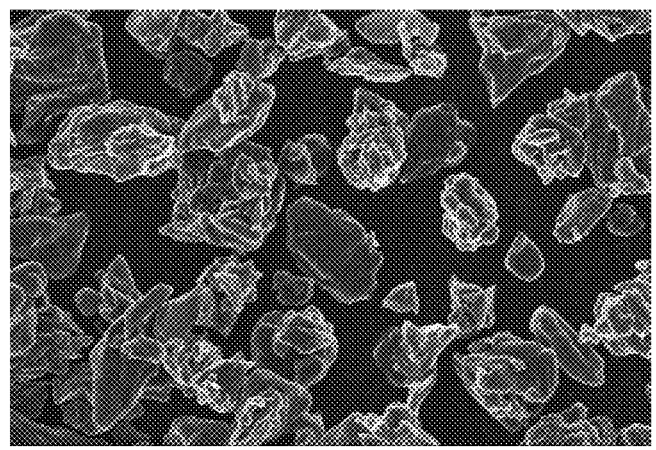
Figure 11:
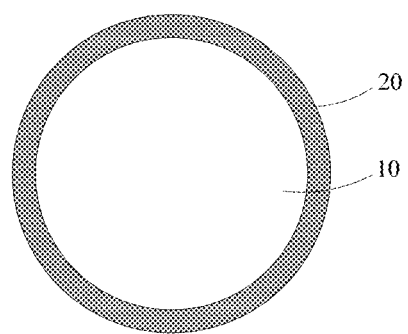
FIG. 11 is a schematic structural diagram of a composite graphite material provided by an embodiment of the present application.

FIG. 9 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and the secondary battery can be used as a power supply.

Some exemplary embodiments of the present invention are provided as follows.

Embodiment 1. A composite graphite material, comprising a core material and a coating layer that coats at least a portion of the surface of the core material, characterized in that the core material comprises graphite, and the coating layer comprises a coating material containing a cyclic structure moiety, wherein the composite graphite material has a weight-loss rate of from 0.1% to 0.55% when the composite graphite material is heated in an atmosphere of an inert non-oxidative gas at a temperature rising from 40° C. to 800° C.

Embodiment 2. The composite graphite material according to Embodiment 1, characterized in that the composite graphite material has a weight-loss rate of from 0.10% to 0.4%, preferably from 0.1% to 0.3%, when the composite graphite material is heated in an inert non-oxidative atmosphere at a temperature rising from 40° C. to 800° C.

Embodiment 3. The composite graphite material according to Embodiment 1 or 2, characterized in that the cyclic structure moiety contains a carbon-nitrogen double bond and a carbon-carbon double bond.

Embodiment 4. The composite graphite material according to any one of Embodiments 1 to 3, characterized in that the cyclic structure moiety comprises one or more of Formulae 1 to 3:

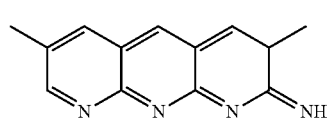

Formula 1

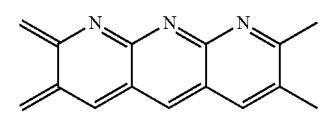

Formula 2

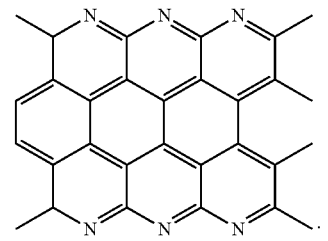

Formula 3

Embodiment 5. The composite graphite material according to any one of Embodiments 1 to 4, characterized in that the core material is artificial graphite.

Embodiment 6. The composite graphite material according to Embodiment 5, characterized in that the composite graphite material has a D-peak intensity $I_D$ and a G-peak intensity $I_G$, and the ratio of $I_D/I_G$ is from 0.4 to 1.0, preferably from 0.5 to 0.85.

Embodiment 7. The composite graphite material according to Embodiment 5 or 6, characterized in that the composite graphite material satisfies a ratio of the peak area $C_{004}$ of 004 crystal plane to the peak area $C_{110}$ of 110 crystal plane of the composite graphite material $C_{004}/C_{110} \leq 15$, preferably $8 \leq C_{004}/C_{110} \leq 12$, when the composite graphite material is in an electrode plate with a compaction density of from 1.6 g/cm$^3$ to 1.7 g/cm$^3$.

Embodiment 8. The composite graphite material according to any one of Embodiments 5 to 7, characterized in that the composite graphite material further satisfies one or more of the following (1) to (6):

(1) the composite graphite material has a $D_v50$ of from 15 μm to 20 μm, preferably from 15 μm to 18 μm;

(2) the composite graphite material has a $D_v10$ of at least 6 μm, preferably from 6.5 μm to 10.5 μm;

(3) the composite graphite material has a $D_n10$ of from 1.0 μm to 3.0 μm, preferably from 1.2 μm to 2.0 μm;

(4) the composite graphite material has a specific surface area of from 0.5 μm$^2$/g to 1.2 m$^2$/g, preferably from 0.6 μm$^2$/g to 1.0 μm$^2$/g;

(5) the composite graphite material has a compaction density under a pressure of 5 tons of from 1.80 g/cm$^3$ to 2.10 g/cm$^3$, preferably from 1.93 g/cm$^3$ to 2.05 g/cm$^3$; and (6) the composite graphite material has a tap density of from 0.8 g/cm$^3$ to 1.15 g/cm$^3$, preferably from 0.9 g/cm$^3$ to 1.05 g/cm$^3$.

Embodiment 9. The composite graphite material according to any one of Embodiments 1 to 8, characterized in that the composite graphite material has a sulfur content of less than 0.02 wt. %.

Embodiment 10. A method for preparing a composite graphite material, characterized in that the method comprises the steps of (1) mixing a solution containing a cyclizable polymer with a graphite core material to obtain a slurry, wherein a mass ratio of the core material to the cyclizable polymer is from 30:1 to 400:1;

(2) drying the slurry to obtain powder;

(3) heat treating the powder at a temperature between 300° C. and 400° C. to obtain the composite graphite material comprising a core material and a coating layer coating at least a portion of the surface of the core material, wherein the core material comprises graphite, and the coating layer comprises a coating material containing a cyclic structure moiety, and wherein the composite graphite material has a weight-loss rate of from 0.1% to 0.55% when the composite graphite material is heated in an atmosphere of an inert non-oxidative gas at a temperature rising from 40° C. to 800° C.

Embodiment 11. The method according to Embodiment 10, characterized in that a mass ratio of the graphite core material to the cyclizable polymer, $m_G:m_P$, is from 40:1 to 200:1, preferably from 50:1 to 150:1.

Embodiment 12. The method according to Embodiment 10 or 11, characterized in that the cyclizable polymer comprises one or more of polyacrylonitrile or copolymers thereof, and preferably the cyclizable polymer comprises polyacrylonitrile.

Embodiment 13. The method according to any one of Embodiments 10 to 12, characterized in that the cyclizable polymer has a number average molecular weight of from 50,000 to 150,000 Da, preferably from 80,000 to 120,000 Da.

Embodiment 14. The method according to Embodiment 10, characterized in that in the step (3), the powder is heat treated at a temperature between 350° C. and 400° C.; and/or the heat treating time is from 3 hours to 6 hours, preferably from 3.5 hours to 5 hours.

Embodiment 15. A secondary battery comprising a negative electrode plate which comprises a negative active material, characterized in that the negative active material comprises the composite graphite material according to any one of Embodiments 1 to 9.

Embodiment 16. An apparatus characterized in that the apparatus comprises the secondary battery according to Embodiment 15.

EXAMPLES

The disclosure of the present application is described in more details through the following examples, which are only for illustrative purpose, because it is apparent to a person of ordinary skill in the art that various modifications and changes could be made within the scope of the disclosure of the present application. Unless otherwise stated, all parts, percentages, and ratios reported in the examples below are based on weight, all the reagents used in the examples are commercially available or synthesized according to conventional methods and can be directly used without further treatment, and all the instruments used in the examples are commercially available.

The core material used in the examples below may be obtained commercially, or prepared according to the process described as follows.

(1) Preparation of Artificial Graphite A

A non-needle green petroleum coke used as raw material (with volatile content of about 9.5%, sulfur content was about 0.5%) was crushed and classified; the crushed particle product was shaped; the shaped particle product was loaded into a reactor of a pelletizer to be pelletized without addition of a binder; then the pelletized raw material was subjected to a graphitization treatment at about 3000° C. to obtain artificial graphite A.

(2) Preparation of Artificial Graphite B

A needle-shaped cooked petroleum coke used as raw material was crushed and classified; the crushed raw material was pelletized with addition of pitch as a binder in an amount of 8% relative to the total weight of the raw material; then the pelletized raw material was subjected to a graphitization treatment at about 2900° C. to obtain artificial graphite B.

Example 1

Preparation of Composite Graphite Material

1) Providing a solution containing cyclizable polymer

Polyacrylonitrile (PAN) was mixed in N-dimethylformamide as solvent, and mixture was stirred until the polymer dissolved completely;

2) Artificial graphite A was added into the solution obtained in step 1), stirred until uniformly mixed to obtain a slurry of mixture;

3) The slurry obtained in step 2) was transferred to a spray drying equipment through a peristaltic pump operating at a rotation speed of 20 rpm, and was dried in a nitrogen atmosphere at 190° C. to obtain dried powder;

4) The dried powder was heat treated in a nitrogen atmosphere at a temperature of 400° C. for 4 hours so as to obtain the composite graphite material.

Preparation of Negative Electrode Plate

The composite graphite material as prepared above, Super P as a conductive agent, styrene butadiene rubber (SBR) as a binder, and CMC-Na as a thickener were mixed at a mass ratio of 96.2:0.8:1.8:1.2 in an appropriate amount of deionized water under vigorous agitation to form a uniform negative electrode slurry; the negative electrode slurry was coated on the surface of a copper foil as the negative electrode current collector, dried and then cold pressed to obtain the negative electrode plate. The compaction density of the negative electrode plate was 1.65 g/cm$^3$, and the areal density was 10.7 mg/cm$^2$.

Preparation of Positive Electrode Plate $LiNi_{0.5}C_{002}In_{0.3}O_2$ (NCM523) as a positive active material, Super P as a conductive agent, and PVDF as a binder were mixed at a mass ratio of 96:2:2 in an appropriate amount of N-methylpyrrolidone (NMP) as a solvent to make a uniform positive electrode slurry; the positive electrode slurry was coated on the surface of an aluminum foil as the positive electrode current collector, dried and then cold pressed to obtained the positive electrode plate.

Preparation of Electrolytic Solution

Ethylene carbonate (EC), ethyl methyl carbonate (EMC), and diethyl carbonate (DEC) were mixed at a volume ratio of 1:1:1, and then $LiPF_6$ was uniformly dissolved in the thus-obtained solvent to obtain the electrolytic solution, in which the concentration of $LiPF_6$ was 1 mol/L.

Separator

Polyethylene (PE) film was used as the separator.

Preparation of Secondary Battery

The positive electrode plate, the separator, and the negative electrode plate were stacked in order and then wound to obtain a battery core; the battery core was put into the outer package, and the above-described electrolytic solution was injected; and after encapsulation, standing, formation, and aging, the secondary battery was obtained.

Examples 2-11 and Comparative Examples 1-8

In Examples 2-11 (Ex. 2-11) and Comparative Examples 1-8 (CE. 1-8), the preparation processes similar to those of Example 1 were used, and the differences therebetween were shown in Table 1 in details.

Test Section (1) Thermogravimetry Analysis (TG)

The negative active materials of the examples and comparative examples were analyzed using a STA449F3-type simultaneous thermal analyzer. The analysis was carried out in a nitrogen atmosphere at a temperature rising from 40° C. to 800° C. at a rate of 10° C./min. The percentages by mass of the material on analysis relative to the original material were recorded at various temperatures.

(3) Gram Capacity

The prepared composite graphite material, Super P as a conductive agent, and PVDF as a binder were mixed uniformly at a mass ratio of 91.6:1.8:6.6 in NMP (N-methylpyrrolidone) as a solvent to form a slurry; the slurry was coated on a copper foil as the current collector and dried in an oven for later use. A lithium metal sheet was used as the counter electrode; a polyethylene (PE) film was used as the separator. Ethylene carbonate (EC), ethyl methyl carbonate (EMC), and diethyl carbonate (DEC) were mixed at a volume ratio of 1:1:1, and then $LiPF_6$ was uniformly dissolved in the thus-obtained solvent to obtain the electrolytic solution, in which the concentration of $LiPF_6$ was 1 mol/L. The aforesaid components were assembled into a CR2430-typed button battery in a glove box under protection of argon.

After standing for 12 hours, the thus-obtained button battery was discharged at a constant current of 0.05 C to 0.005V and kept standing for 10 minutes; then it was discharged at a constant current of 50 μA to 0.005V and kept standing for 10 minutes; afterwards it was discharged at a constant current of 10 μA current to 0.005V; finally the battery was charged at a constant current of 0.1 C to 2V, and the charge capacity was recorded. The ratio of the charge capacity to the mass of the composite graphite material is determined as the gram capacity of the prepared composite graphite material.

A CT220A-model battery test system from LANHE can be used to measure the button battery and determine the gram capability of the composite graphite material by calculation.

(4) Cycle Performance

At 25° C., a lithium-ion secondary battery was charged with a constant current of 1 C to 4.3V, then charged under a constant voltage until the current was less than or equal to 0.05 C, and then discharged at a constant current of 1 C to 2.8V. This was a charge-discharge cycle. The discharge capacity at this time was the discharge capacity of the first cycle. The lithium ion battery was subjected to 1400 charge-discharge cycles according to the above method, the discharge capacity of the $1400^{th}$ cycle was recorded, and the capacity retention rate of the lithium ion battery after 1400 cycles at 1 C/1 C was calculated.

Capacity retention rate of lithium ion battery after 1400 cycles at 1 C/1 C (%)=discharge capacity of the $1400^{th}$ cycle/discharge capacity of the $1^{st}$ cycle×100%

(5) Cyclic Expansion Rate of Negative Electrode Plate

The thickness of the negative electrode plate after cold pressing was recorded as $H_0$. The cold-pressed negative electrode plate, positive electrode plate, separator, and electrolytic solution were made into a secondary battery. At 25° C., the secondary battery was subjected to a 100% DOD (100% depth of discharge, that is to say, fully charged and then fully discharged) 1 C/1 C cycle in the NEWARE charger and discharge machine. A full charge and discharge cycle was recorded as one circle, and the cycling was stopped after 1400 cycles. Then the secondary battery was charged to 100% SOC (State of Charge), and disassembled, and then the thickness of the corresponding negative electrode plate was measured and denoted as $H_1$. The cyclic expansion rate of the negative electrode plate was determined as: $(H_1/H_0-1)\times 100\%$.

(6) Kinetic Performance

At 25° C., the batteries prepared in the Examples and Comparative examples were fully charged at x C and then fully discharged at 1 C for 10 times, and finally fully charged at x C; afterwards the negative electrode plates were taken out to observe lithium plating on the surface of the electrode plate. If no lithium was plated on the surface of the negative electrode, the battery was tested with an increment of 0.1 C to the charge rate×C until lithium was plated on the surface of the negative electrode, and then the test was stopped. The charge rate (x−0.1) C at this time was the maximum charge rate of the battery.

The composite graphite materials were tested for other parameters according to the test methods described above.

TABLE 1

| No. | Core mat. | Polymer for coating layer | $m_G$:$m_P$ | Heat treatment Tem. (°C.) | Heat treatment Time (h) | Wt-loss rate % | $D_v50$ μm | $D_v10$ μm | $D_n10$ μm | SSA m²/g | Graphitization % | $I_D/I_G$ | OI at PD of 1.65 g/cm³ | S cont. wt. % | Gram capability mAh/g | Max. charge rate C | Cycle capacity retention rate % | Expansion rate of electrode plate |
|---|---|---|---|---|---|---|---|---|---|---|---|---|---|---|---|---|---|---|
| Ex. 1 | A | PAN | 30:1 | 400 | 4 | 0.53 | 16.9 | 8.0 | 1.6 | 0.67 | 92.4 | 0.94 | 10.5 | 0.0013 | 357.2 | 1.7 | 90.2% | 29.8% |
| Ex. 2 | A | PAN | 50:1 | 400 | 4 | 0.47 | 16.8 | 8.1 | 1.5 | 0.75 | 92.7 | 0.82 | 10.8 | 0.0014 | 356.4 | 1.7 | 90.5% | 27.9% |
| Ex. 3 | A | PAN | 70:1 | 400 | 4 | 0.34 | 17.0 | 8.0 | 1.6 | 0.84 | 92.9 | 0.73 | 9.8 | 0.0012 | 355.8 | 1.7 | 91.9% | 27.7% |
| Ex. 4 | A | PAN | 100:1 | 400 | 4 | 0.27 | 16.9 | 8.2 | 1.6 | 0.93 | 92.3 | 0.64 | 10.4 | 0.0011 | 355.3 | 1.7 | 92.6% | 27.2% |
| Ex. 5 | A | PAN | 200:1 | 400 | 4 | 0.13 | 16.8 | 8.1 | 1.5 | 1.05 | 92.5 | 0.59 | 10.6 | 0.0013 | 354.6 | 1.7 | 91.8% | 27.5% |
| Ex. 6 | A | PAN | 100:1 | 300 | 4 | 0.32 | 17.0 | 8.1 | 1.7 | 0.90 | 92.5 | 0.39 | 10.3 | 0.0014 | 354.7 | 1.7 | 90.8% | 28.9% |
| Ex. 7 | A | PAN | 100:1 | 350 | 4 | 0.29 | 17.0 | 8.1 | 1.6 | 0.91 | 92.4 | 0.45 | 10.6 | 0.0012 | 355.7 | 1.7 | 91.7% | 28.2% |
| Ex. 8 | A | PAN | 100:1 | 400 | 3 | 0.31 | 16.9 | 8.2 | 1.6 | 0.90 | 92.7 | 0.62 | 10.6 | 0.0011 | 354.6 | 1.7 | 91.5% | 28.1% |
| Ex. 9 | A | PAN | 100:1 | 400 | 5 | 0.24 | 16.8 | 8.2 | 1.6 | 0.95 | 92.3 | 0.65 | 10.9 | 0.0011 | 355.2 | 1.7 | 92.4% | 27.3% |
| Ex.10 | A | PAN-co-Vac | 100:1 | 400 | 4 | 0.19 | 16.7 | 8 | 1.6 | 0.89 | 92.5 | 0.51 | 10.3 | 0.0014 | 354.3 | 1.6 | 91.5% | 29.4% |
| Ex.11 | B | PAN | 100:1 | 400 | 4 | 0.28 | 13.7 | 6.8 | 4.2 | 0.67 | 93.0 | 0.74 | 25.2 | 0.0012 | 355.2 | 1.8 | 91.4% | 34.2% |
| CE. 1 | A | / | / | / | / | / | 16.2 | 7.5 | 1.5 | 1.25 | 92.7 | 0.21 | 13.0 | 0.0013 | 354.0 | 1.5 | 86.9% | 31.8% |
| CE. 2 | B | / | / | / | / | / | 12.9 | 6.6 | 4.1 | 1.01 | 93.0 | 0.32 | 26.3 | 0.0013 | 354.2 | 1.6 | 87.1% | 36.7% |
| CE. 3 | A | PAN | 500:1 | 400 | 4 | 0.09 | 16.9 | 8.1 | 1.6 | 1.12 | 92.6 | 0.38 | 12.2 | 0.0012 | 354.2 | 1.6 | 87.6% | 30.1% |
| CE. 4 | A | PAN | 20:1 | 400 | 4 | 0.66 | 17.0 | 8.2 | 1.6 | 0.60 | 92.5 | 1.06 | 10.2 | 0.0013 | 358.7 | 1.7 | 85.9% | 31.6% |
| CE. 5 | A | PAN | 100:1 | 1000 | 4 | 0.005 | 16.8 | 8 | 1.6 | 0.95 | 92.9 | 0.39 | 13.0 | 0.0024 | 352.7 | 1.6 | 87.2% | 30.7% |
| CE. 6 | A | PAN | 100:1 | 200 | 4 | 0.70 | 16.9 | 8.2 | 1.6 | 0.88 | 92.7 | 0.22 | 12.7 | 0.0014 | 352.6 | 1.5 | 86.6% | 31.7% |
| CE. 7 | A | PAN | 100:1 | / | / | 0.97 | 16.9 | 8.2 | 1.6 | 0.82 | 92.6 | 0.23 | 13.1 | 0.0016 | 352.0 | 1.5 | 86.4% | 32.7% |
| CE. 8 | A | pitch | 100:1 | 1100 | 4 | 0.01 | 16.8 | 8.0 | 1.6 | 1.03 | 92.6 | 0.42 | 12.9 | 0.0068 | 353.4 | 1.6 | 87.3% | 31.9% |

From the comparisons of Comparative Example 1 with Examples 1 to 5 and of Comparative Example 2 with Example 11, it was demonstrated that both the gram capability and the anti-swelling performance were significantly improved by coating the coating material having the specified structure on the surface of graphite. From the comparison of Comparative Examples 3 and 4 with Examples 1 to 5, it was demonstrated that under the same conditions for heat treatment, the higher gram capability and excellent anti-swelling performance were achieved by controlling the mass ratio of graphite to cyclizable polymer and adjusting the weight-loss rate of the composite graphite materials. In Comparative Example 4, in which excessive coating was carried out, the coating layer consumed an excessive amount of active lithium and caused a large loss of active lithium, rendering the cycle performance degraded.

From the comparison of Comparative Example 7 with Example 4, it was demonstrated that the partially carbonized composite graphite material, as compared with the graphite material coated with the uncarbonized polymer, can significantly improve the gram capability and also the cycle performance and anti-swelling performance of the battery. From the comparison of Comparative Example 5 with Example 4, it was demonstrated that when the heat-treating temperature reached 1000° C., the degree of carbonization was too high so that the desirable cyclic structure moieties got to destruct, resulting in a decrease of the gram capability and a considerable increase of the expansion rate.

From the comparison of Comparative Examples 1 and 8 with Example 4, it was demonstrated that when polyacrylonitrile was used as the cyclizable polymer, as compared with the conventional coating materials, the gram capability was significantly enhanced, and the anti-swelling performance was substantively improved as well.

Besides the effects of the coating materials and the degree of carbonization on the battery performance as discussed above, surprisingly, the inventors found that when artificial graphite A was used as the core material, the expansion rate of the electrode plate in the battery was significantly reduced, and the cycle performance of the battery was improved. This was demonstrated by the comparison between Examples 4 and 11.

As shown in FIG. 2, the ratio of a D-peak intensity $I_D$ to a G peak intensity $I_G$, $I_D/I_G$, of the composite graphite material of Example 2 was 0.82, within the range from 0.4 to 1.0. The ratio of a D-peak intensity $I_D$ to a G peak intensity $I_G$, $I_D/I_G$, of Comparative Example 1 was 0.21, out of the range from 0.4 to 1.0. Here, Peak D is at the position of 1300 cm$^{-1}$ to 1400 cm$^{-1}$, and Peak G is at the position of 1550 cm$^{-1}$ to 1620 cm$^{-1}$.

Above described are only specific implementations of the present application, but the claim scope of the present application are not intended to be limited thereto. Any modification, replacement, or other equivalent readily conceived by a person of ordinary skill in the art according to the disclosure of the present application shall fall within the protection scope of the present application. Therefore, the protection scope of the present application shall be determined by the protection scope of the claims.

What is claimed is:

1. A composite graphite material, comprising a core material and a coating layer that coats at least a portion of the surface of the core material, characterized in that the core material comprises graphite, and the coating layer comprises a coating material containing a cyclic structure moiety, wherein the composite graphite material has a weight-loss rate of from 0.1% to 0.55% when the composite graphite material is heated at a heating rate of 10° C./min or lower in an atmosphere of an inert non-oxidative gas at a temperature rising from 40° C. to 800° C., and wherein the cyclic structure moiety comprises one or more of Formulae 1 to 3:

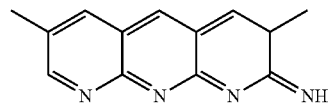

Formula 1

-continued

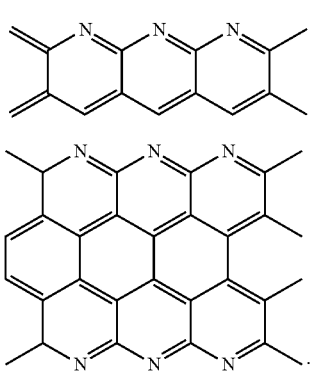

Formula 2

Formula 3

2. The composite graphite material according to claim 1, characterized in that the composite graphite material has a weight-loss rate of from 0.1% to 0.4%, when the composite graphite material is heated at a heating rate of 10° C./min or lower in the atmosphere of an inert non-oxidative gas at a temperature rising from 40° C. to 800° C.

3. The composite graphite material according to claim 1, characterized in that the composite graphite material has a sulfur content of less than 0.02 wt. %.

4. The composite graphite material according to claim 1, characterized in that the core material is artificial graphite.

5. The composite graphite material according to claim 4, characterized in that the composite graphite material has a D-peak intensity $I_D$ and a G-peak intensity $I_G$, and the ratio of $I_D/I_G$ is from 0.4 to 1.0.

6. The composite graphite material according to claim 4, characterized in that the composite graphite material satisfies a ratio of the peak area $C_{004}$ of 004 crystal plane to the peak area $C_{110}$ of 110 crystal plane of the composite graphite material $C_{004}/C_{110} \leq 15$, when the composite graphite material is in an electrode plate with a compaction density of from 1.6 g/cm³ to 1.7 g/cm³.

7. The composite graphite material according to claim 4, characterized in that the composite graphite material further satisfies one or more of the following (1) to (6):
(1) the composite graphite material has a $D_v50$ of from 15 µm to 20 µm;
(2) the composite graphite material has a $D_v10$ of at least 6 µm;
(3) the composite graphite material has a $D_n10$ of from 1.0 µm to 3.0 µm;
(4) the composite graphite material has a specific surface area of from 0.5 m²/g to 1.2 m²/g;
(5) the composite graphite material has a compaction density under a pressure of 5 tons of from 1.80 g/cm³ to 2.10 g/cm³; and
(6) the composite graphite material has a tap density of from 0.8 g/cm³ to 1.15 g/cm³.

8. The composite graphite material according to claim 4, characterized in that the composite graphite material further satisfies one or more of the following (1) to (6):
(1) the composite graphite material has a $D_v50$ of from 15 µm to 18 µm;
(2) the composite graphite material has a $D_v10$ of from 6.5 µm to 10.5 µm;
(3) the composite graphite material has a $D_n10$ of from 1.2 µm to 2.0 µm;
(4) the composite graphite material has a specific surface area of from 0.6 m²/g to 1.0 m²/g;
(5) the composite graphite material has a compaction density under a pressure of 5 tons of from 1.93 g/cm³ to 2.05 g/cm³; and
(6) the composite graphite material has a tap density of from 0.9 g/cm³ to 1.05 g/cm³.

9. A method for preparing a composite graphite material, characterized in that the method comprises the steps of
(1) mixing a solution containing a cyclizable polymer with a graphite core material to obtain a slurry, wherein a mass ratio of the core material to the cyclizable polymer is from 30:1 to 400:1;
(2) drying the slurry to obtain powder;
(3) heat treating the powder at a temperature between 300° C. and 400° C. to obtain the composite graphite material comprising a core material and a coating layer that coats at least a portion of the surface of the core material,
wherein the core material comprises graphite, and the coating layer comprises a coating material containing a cyclic structure moiety, and wherein the composite graphite material has a weight-loss rate of from 0.1% to 0.55% when the composite graphite material is heated at a heating rate of 10° C./min or lower in an atmosphere of an inert non-oxidative gas at a temperature rising from 40° C. to 800° C., and wherein the cyclic structure moiety comprises one or more of Formulae 1 to 3:

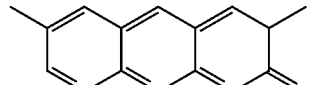

Formula 1

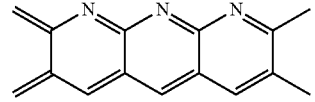

Formula 2

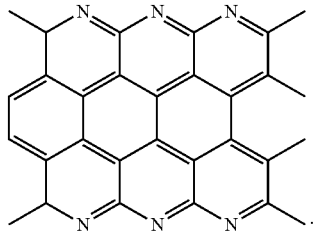

Formula 3

10. The method according to claim 9, characterized in that a mass ratio of the graphite core material to the cyclizable polymer, $m_G:m_P$, is from 40:1 to 200:1.

11. The method according to claim 9, characterized in that the cyclizable polymer comprises one or more of polyacrylonitrile or copolymers thereof.

12. The method according to claim 9, characterized in that the cyclizable polymer has a number average molecular weight of from 50,000 to 150,000 Da.

13. The method according to claim 9, characterized in that in the step (3),
the powder is heat treated at a temperature between 350° C. and 400° C.; and/or
the heat treating time is from 3 hours to 6 hours.

14. A secondary battery comprising a negative electrode plate which comprises a negative active material, characterized in that the negative active material comprises a composite graphite material comprising a core material and a coating layer that coats at least a portion of the surface of the core material, characterized in that the core material comprises graphite, and the coating layer comprises a coating material containing a cyclic structure moiety, wherein the composite graphite material has a weight-loss rate of from 0.1% to 0.55% when the composite graphite material is heated at a heating rate of 10° C./min or lower in an atmosphere of an inert non-oxidative gas at a temperature rising from 40° C. to 800° C., and wherein the cyclic structure moiety comprises one or more of Formulae 1 to 3:

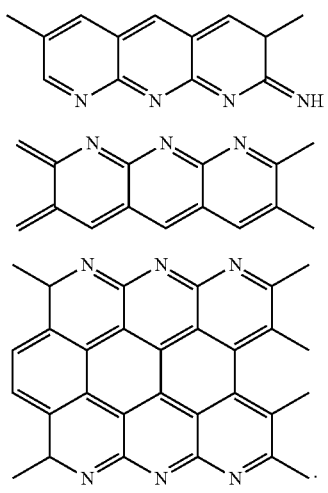

Formula 1

Formula 2

Formula 3

15. The secondary battery according to claim 14, characterized in that the composite graphite material has a sulfur content of less than 0.02 wt. %.

16. The secondary battery according to claim 14, characterized in that the core material is artificial graphite.

17. The secondary battery according to claim 16, characterized in that the composite graphite material has a D-peak intensity $I_D$ and a G-peak intensity $I_G$, and the ratio of $I_D/I_G$ is from 0.4 to 1.0.

18. The secondary battery according to claim 16, characterized in that the composite graphite material satisfies a ratio of the peak area $C_{004}$ of 004 crystal plane to the peak area $C_{110}$ of 110 crystal plane of the composite graphite material $C_{004}/C_{110} \leq 15$, when the composite graphite material is in an electrode plate with a compaction density of from 1.6 g/cm$^3$ to 1.7 g/cm$^3$.

19. The secondary battery according to claim 16, characterized in that the composite graphite material further satisfies one or more of the following (1) to (6):
    (1) the composite graphite material has a $D_v50$ of from 15 μm to 20 μm;
    (2) the composite graphite material has a $D_v10$ of at least 6 μm;
    (3) the composite graphite material has a $D_n10$ of from 1.0 μm to 3.0 μm;
    (4) the composite graphite material has a specific surface area of from 0.5 m$^2$/g to 1.2 m$^2$/g;
    (5) the composite graphite material has a compaction density under a pressure of 5 tons of from 1.80 g/cm$^3$ to 2.10 g/cm$^3$; and
    (6) the composite graphite material has a tap density of from 0.8 g/cm$^3$ to 1.15 g/cm$^3$.

20. The secondary battery according to claim 16, characterized in that the composite graphite material further satisfies one or more of the following (1) to (6):
    (1) the composite graphite material has a $D_v50$ of from 15 μm to 18 μm;
    (2) the composite graphite material has a $D_v10$ of from 6.5 μm to 10.5 μm;
    (3) the composite graphite material has a $D_n10$ of from 1.2 μm to 2.0 μm;
    (4) the composite graphite material has a specific surface area of from 0.6 m$^2$/g to 1.0 m$^2$/g;
    (5) the composite graphite material has a compaction density under a pressure of 5 tons of from 1.93 g/cm$^3$ to 2.05 g/cm$^3$; and
    (6) the composite graphite material has a tap density of from 0.9 g/cm$^3$ to 1.05 g/cm$^3$.

* * * * *